United States Patent [19]

Vitrac

[11] Patent Number: 4,530,570
[45] Date of Patent: Jul. 23, 1985

[54] TRANSPARENCY VIEWER

[75] Inventor: Jean-Pierre Vitrac, Paris, France

[73] Assignee: Stereoscopes Lestrade & Cie., S.A., Vic Bigorre, France

[21] Appl. No.: 482,959

[22] Filed: Apr. 7, 1983

[30] Foreign Application Priority Data

Jan. 14, 1983 [FR] France .............. 83 00523

[51] Int. Cl.³ .............................. G02B 27/02
[52] U.S. Cl. ................... 350/241; 40/363; 40/366; 350/240
[58] Field of Search ........... 40/361, 362, 363, 366; 350/236, 238, 241, 240

[56] References Cited

U.S. PATENT DOCUMENTS 2,467,014  4/1949  Dilks ............................ 40/363
2,572,602  10/1951 Dilks ............................ 40/71
4,089,593  5/1978  Bernard ....................... 350/236

FOREIGN PATENT DOCUMENTS 2232343  1/1974  Fed. Rep. of Germany.
1529917  6/1968  France.

Primary Examiner—John K. Corbin
Assistant Examiner—William Propp
Attorney, Agent, or Firm—Woodling, Krost, Rust and Hochberg

[57] ABSTRACT

A device is adapted for viewing transparencies disposed circumferentially on a disk. It comprises a case (10) adapted to contain a disk (12). A pin (15) is adapted to mount the disk (12) for rotation within the case (10). The disk (12) may be driven in rotation by virtue of at least one peripheral opening (10F, 10G) in the case (10). A pair of windows (10C, 10D) are disposed in face to face relationship and so that the transparencies (13) can move between them. A front member (11B) on one side of the windows is adapted to support an optical system comprising at least one lens (15) in line with and spaced from the windows. A rear member (11C) is adapted to constitute a shank for clipping the device to an article of clothing. The device may be used and worn as a badge, since the front surface of the case (10) may carry any form of inscription or illustration.

11 Claims, 3 Drawing Figures

TRANSPARENCY VIEWER

BACKGROUND OF THE INVENTION

Field of the Invention

The present invention concerns a device for viewing transparencies disposed circumferentially on a supporting disk, in a manner known per se.

SUMMARY OF THE INVENTION

The invention consists in a device for viewing transparencies disposed circumferentially on a disk, comprising a case adapted to contain a disk, a pin adapted to mount said disk for rotation in said case, at least one peripheral opening in said case whereby said disk may be driven in rotation on said pin, a pair of windows disposed in face to face relationship and so that said transparencies can move between them, a front member on one side of said windows adapted to support, in line with and spaced from said windows, an optical system comprising at least one lens, and a rear member on the opposite side of said windows adapted to constitute a shank for clipping the device to an article of clothing.

The device thus conceived of may be rendered particularly attractive through the facility that it offers for use and wear as an insignia, particularly as a badge type insignia, the front surface of the case being available for any kind of inscription or illustration, corresponding to the personality of the user, a tourist area which the transparencies illustrate, the trade of a business, etc. . . .

The device in accordance with the invention also lends itself to extensive commercial exploitation by virtue of the facility for mass producing it under highly favourable economic conditions.

In one embodiment, the front and rear members are integral with one another and form a bridge member adapted to interlock with the case, which may be changed as required by the user, so that the user may employ the same optical system and shank assembly to view any number of transparency disks.

Other objects and advantages will appear from the following description of an example of the invention, when considered in connection with the accompanying drawing, and the novel features will be particularly pointed out in the appended claims.

Figure 1:
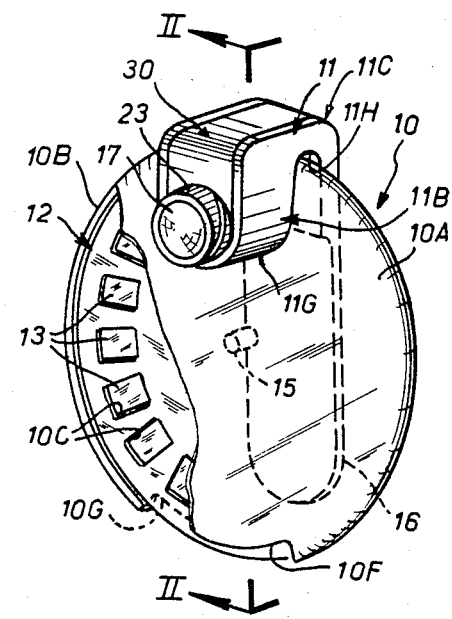
FIG. 1 is a perspective view of the device in accordance with the invention ready for use.

In one embodiment of the invention, as shown in the figures, the device comprises a case 10 constituted by two shells 10A, 10B, hereinafter referred to as the front and back shells, respectively, which when assembled together, with an elastic interlocking action, for example, are adapted to accommodate a disk 12 carrying a series of tranparencies 13 of a selected format in the circumferential row at a given radius. Disk 12 has a central hole 14 by means of which it is mounted to rotate on a pin 15 which in the example shown is rigidly attached to back shell 10B; to prevent disk 12 escaping from pin 15, the pin is so disposed that its free end is virtually in contact with the inside surface of front shell 10A.

Shells 10A, 10B are preferably of a plastics material, and each has a window 10C, 10D corresponding to the transparency format; these windows are in face to face relationship when the shells are assembled together and are disposed so that the transparencies can move between them.

The case formed in this way is adapted to permit the disk to be grasped and thus driven in rotation.

In the embodiment shown, the disk is grasped opposite the windows, and thus according to a diametral line, since the shells are circular; to this end, at least one of the shells and for preference both of them comprises an opening 10F, 10G exposing a peripheral section of disk 12.

On one side of aforementioned windows 10C, 10D the device comprises a front member 11B adapted to support an optical system comprising at least one lens 17, spaced from and facing said windows. On the other side is a rear member 11C adapted to form a shank 16 for clipping the device to an article of clothing. This is accomplished by sliding shank 16 over a layer of the article of clothing, such as the outer layer of a pocket, so that the layer is disposed between shank 16 and back shell 10B.

In a preferred embodiment, the front and rear members 11B, 11C are integral with one another and molded from a plastics material.

Figure 3:
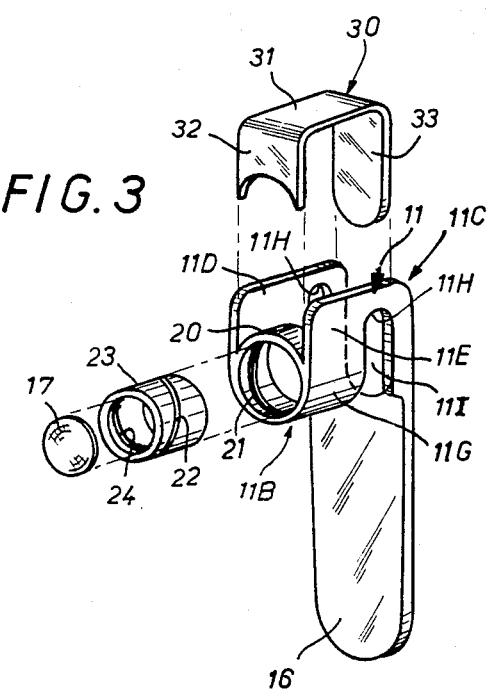
FIG. 3 is an exploded view in perspective of the second element.
Figure 2:
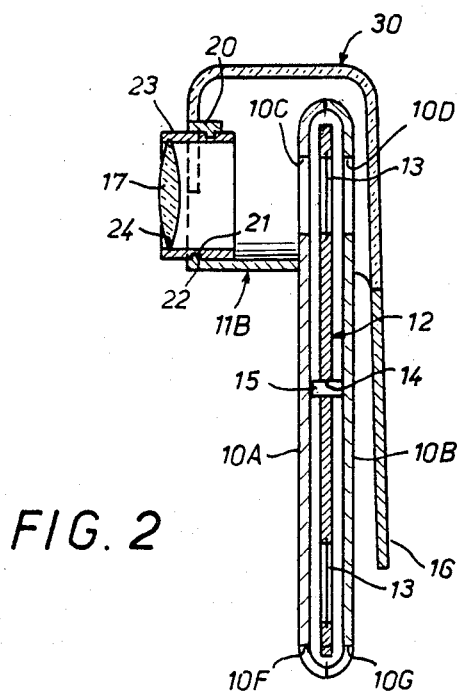
FIG. 2 is a view of the device in cross-section on a plane indicated II—II in FIG. 1.

In this kind of embodiment, as seen in FIG. 3 particularly, the front and rear members form a bridge member 11 which may interlock radially on case 10, by virtue of a notch 11H extending between said members. The upper parts of front and rear members 11B, 11C are formed by two spaced and parallel flanges 11D, 11E which extend from one end of the front member to the opposite end of the rear member. In so far as the front member is concerned, these flanges are linked by a semi-cylindrical part 11G, so that this member has a generally U-shaped transverse cross-section, whereas in so far as rear member 11C is concerned, an opening 11I is formed in the upper part of the member, between the flanges.

Each flange 11D and 11E comprises a notch 11H having a profile in correspondence with a peripheral area of case 10 so as to permit interlocking of said member with case 10.

At its free end front member 11B accommodates an optical viewing system consising in this instance of a single lens 17, which may be fixed to it in any appropriate manner but which is for preference mounted so as to be axially adjustable between two end positions, so as to permit the position of the optical system, which is of short focal length to reduce the overall dimensions of the device, to be adapted to the vision of the user.

To this end, said free end is provided with a ring 20 comprising on its inside surface a screwthread configured helical rib 21 which cooperates with a groove 22 formed in the outside surface of a knurled tube 23. Lens 17 may advantageously be fixed into knurled tube 23 by virtue of elastic interlocking engagement in a groove 24 formed for this purpose inside said tube.

Rotation of tube 23 moves lens 17 relative to the transparencies so that the position of the lens may be adapted to the vision of the user.

With regard to the adjustable mounting of lens 17 of the front member, note that ring 20 could be dispensed with; in this case, adjustment of lens 17 could be achieved by forming a helical rib on the inside surface of semi-cylindrical part 11G, or at least one projecting peg, the rib and the peg being adapted to cooperate with groove 22 formed on the outside surface of the tube.

The device is advantageously provided with a diffuser, of a translucent material, disposed opposite at least window 10D in the back shell.

In a preferred embodiment, the bridge member accommodates the diffuser 30 (see FIG. 3 in particular). The diffuser has a base 31 with on each side thereof flanges 32, 33 at 90° to it; the end of flange 22 is concave and semi-circular so as to cooperate with ring 20 (or with tube 23 if front member 11B does not comprise any ring), whereas flange 33 is adapted to lie at least partially opposite lens 15 in aforementioned opening 11I.

Diffuser 30 is engaged between flanges 11D, 11E and fixed in this position, for example by clamping, bonding or interlocking of complementary members provided for this purpose.

The integral front and rear members are advantageously associated with the case in a removable manner, so as to render the case interchangeable. To this end, the assembly constituted by these integral members may be attached to case 10 by virtue of a pinching action associated with notches 11H; a pinching action of this kind might where appropriate be complemented by locking means such as projections on the edges of notches 11H adapted to engage in holes or depressions formed for this purpose in either of the shells so that said assembly is automatically positioned correctly on the case, while unwanted separation is prevented although the case may be disassociated from said assembly as and when required.

It should be noted that the free side of the front shell is available for the printing of any form of text or image.

It will be understood that various changes in the details, materials and arrangement of parts, which have been herein described and illustrated in order to explain the nature of the invention, may be made by those skilled in the art within the principle and scope of the invention as expressed in the appended claims. For example, front member 11B carrying the optical system could be molded integrally with shell 10A, while rear member 11C could be molded integrally with shell 10B, said shells being assembled together in a removable manner so as to permit the disk to be changed.

I claim:

1. A device for viewing transparencies disposed circumferentially on a disk, comprising a case adapted to contain a disk, a pin adapted to mount said disk for rotation within said case, at least one peripheral opening in said case defining a manual access for the manual rotation of said disk on said pin, a pair of windows disposed in face to face relationship and so that said transparencies can move between them, a front member on one side of said windows adapted to support, in line with and spaced from said windows, an optical system comprising at least one lens, and a rear member on the opposite side of said windows adapted to constitute a shank for receiving a layer of an article of clothing between said case and said shank for clipping the device to the article of clothing.

2. A device according to claim 1, wherein said case comprises two circular shells which are assembled together with an elastic interlocking action and one of which carries said pin, which is adapted to immobilize said disk in an axial direction.

3. A device according to claim 2, wherein each of said shells comprises a window whose position corresponds to the radius of the circular succession of transparencies and an opening extending over part of its periphery.

4. A device according to claim 1, wherein a window and an opening are in diametrically opposite relationship to one another.

5. A device according to claim 1, wherein said front and rear members are integral with one another and made of a plastics material.

6. A device according to claim 5, wherein said front and rear members constitute a bridge member which is adapted to interlock radially with said case and to this end incorporates a notch extending between said front and rear members and having a profile adapted to match a corresponding part of said case.

7. A device according to claim 6, wherein said bridge member comprises means for locking it onto said case, in the form of at least one projection on said bridge member and a depression formed in said case.

8. A device according to claim 6, wherein said front and rear members have respective upper parts forming spaced parallel flanges each embodying said notch, said flanges on said front member being linked by a semi-cylindrical part.

9. A device according to claim 8, wherein said bridge member is adapted to accomodate a diffuser disposed between said flanges in line with a window in said case opposite said lens.

10. A device according to claim 9, wherein said diffuser is interlocked with and between said flanges.

11. A device according to claim 1, wherein a front surface of said front member comprises a ring having on its inside surface a screwthread configured helical rib, and further comprising a knurled tube adapted to support said optical system and a groove on an outside surface of said tube adapted to cooperate with said rib, whereby axial movement between respective opposite end positions is made possible.

* * * * *